US009963356B2

(12) United States Patent
Bourret-Courchesne et al.

(10) Patent No.: US 9,963,356 B2
(45) Date of Patent: May 8, 2018

(54) ALKALI METAL HAFNIUM OXIDE SCINTILLATORS (75) Inventors: Edith Bourret-Courchesne, Berkeley, CA (US); Stephen E. Derenzo, Pinole, CA (US); Scott Edward Taylor, Pleasant Hill, CA (US)

(73) Assignee: The Regents of the University of California, Oakland, CA (US)

( * ) Notice: Subject to any disclaimer, the term of this patent is extended or adjusted under 35 U.S.C. 154(b) by 497 days.

(21) Appl. No.: 12/262,112

(22) Filed: Oct. 30, 2008

(65) Prior Publication Data

US 2009/0148375 A1 Jun. 11, 2009

Related U.S. Application Data (60) Provisional application No. 60/983,855, filed on Oct. 30, 2007.

(51) Int. Cl.
*C09K 11/67* (2006.01)
*C01F 17/00* (2006.01)
*C01G 27/00* (2006.01)
*G01T 1/202* (2006.01)
*C09K 11/77* (2006.01)
*G21K 4/00* (2006.01)

(52) U.S. Cl.
CPC ............ *C01G 27/00* (2013.01); *C09K 11/671* (2013.01); *C09K 11/7715* (2013.01); *C09K 11/7716* (2013.01); *G01T 1/2023* (2013.01); *G21K 4/00* (2013.01); *C01P 2002/52* (2013.01)

(58) Field of Classification Search
CPC .................. C09K 11/7715; G01T 1/2023
USPC ............... 252/301.4 F; 423/263, 593.15
See application file for complete search history.

(56) References Cited

U.S. PATENT DOCUMENTS

| 3,114,600 | A | * | 12/1963 | Hobin et al. | 423/73 |
| 4,988,881 | A | * | 1/1991 | Bryan et al. | 250/483.1 |
| 2003/0052701 | A1 | * | 3/2003 | Brown et al. | 324/752 |
| 2006/0027742 | A1 | * | 2/2006 | Srivastava et al. | 250/256 |

FOREIGN PATENT DOCUMENTS

JP    59-31730    *   2/1984

OTHER PUBLICATIONS

Georgiev et al, "PAC Studies of Neutron Irradiated Li2HfO3", Hyperfine Interactions, 60, 1990, pp. 735-738.*
Schipper et al, On the Luminescence of Hafnium Compounds, Mat. Res. Bull., vol. 29, 1994, pp. 23-30.*

* cited by examiner

*Primary Examiner* — C Melissa Koslow
(74) *Attorney, Agent, or Firm* — Robin C. Chiang; Lawrence Berkeley National Laboratory (57) ABSTRACT

The present invention provides for a composition comprising an inorganic scintillator comprising an alkali metal hafnate, optionally cerium-doped, having the formula $A_2HfO_3$:Ce; wherein A is an alkali metal having a valence of 1, such as Li or Na; and the molar percent of cerium is 0% to 100%. The alkali metal hafnate are scintillators and produce a bright luminescence upon irradiation by a suitable radiation.

10 Claims, 5 Drawing Sheets

ALKALI METAL HAFNIUM OXIDE SCINTILLATORS

CROSS-REFERENCE TO RELATED APPLICATIONS

This application claims priority to U.S. Provisional Patent Application 60/983,855, filed Oct. 30, 2007, which is hereby incorporated by reference in its entirety.

STATEMENT OF GOVERNMENTAL SUPPORT

The invention described and claimed herein was made utilizing funds supplied by the U.S. Department of Homeland Security under Grant No. HSHQDC07X00170, and the U.S. Department of Energy under Contract No. DE-AC02-05CH11231. The government has certain rights in this invention.

FIELD OF THE INVENTION

The present invention is in the field of inorganic crystals with scintillation properties.

BACKGROUND OF THE INVENTION

There has been a growing interest in the development of scintillator materials with (1) good stopping power for gamma rays, (2) high light output, (3) proportional response, and (4) large, transparent, low cost crystals. Current known scintillators, such as $Bi_4Ge_3O_{12}$ (BGO), NaI:Ti, $BaF_2$, $Lu_2SiO_5$:Ce (LSO), $LaBr_3$:Ce fall short in one or more of these properties.

SUMMARY OF THE INVENTION

The present invention provides for a composition comprising an inorganic scintillator comprising an alkali metal hafnate, optionally cerium-doped, having the formula $A_2HfO_3$:Ce; wherein A is an alkali metal having a valence of 1, such as Li or Na; and the molar percent of cerium is 0% to 100%. The alkali metal hafnate are scintillators and produce a bright luminescence upon irradiation by a suitable radiation.

The present invention also provides for a composition comprising essentially of a mixture of an alkali metal carbonate, oxide or hydroxide, and hafnium oxide useful for producing the inorganic scintillator, wherein the alkali metal has a valence of 1. The mixture comprises essentially of solid alkali metal carbonate, oxide or hydroxide, and solid hafnium oxide, and optionally solid cerium oxide, wherein (a) the mixture has a stoichiometry of about 2 alkali metal atoms: about 1 hafnium atom, and (b) the molar percent of cerium is from 0% to 100%. The solid alkali metal carbonate, oxide or hydroxide can be $Na_2CO_3$, $Li_2O$ or LiOH, respectively. Cerium oxide is $Ce_2O_3$. The crystals or salts can be powdered crystals.

The present invention further provides for a method for producing the composition comprising an inorganic scintillator comprising: (a) providing the composition useful for producing the inorganic scintillator as described above, (b) heating the mixture so that the salts or solids start to react, and (c) cooling the mixture of the formed composition to room temperature such that the inorganic scintillator is formed.

The present invention further provides for a method for producing the composition comprising an inorganic scintillator comprising: (a) providing a mixture comprising essentially of solid alkali metal carbonate, oxide or hydroxide, and solid hafnium oxide, and optionally solid cerium oxide, wherein (i) the mixture has a stoichiometry of about 2 alkali metal atoms: about 1 hafnium atom, and (ii) the molar percent of cerium is from 0% to 100%, (b) heating the mixture so that the salts or solids start to react, and (c) cooling the mixture of the formed composition to room temperature such that the inorganic scintillator is formed.

The invention also provides for a device comprising the composition comprising the inorganic scintillator, wherein the composition is a component of a scintillating detector for industrial, medical, protective and defensive purpose or in the oil and nuclear industry.

BRIEF DESCRIPTION OF THE DRAWINGS

The foregoing aspects and others will be readily appreciated by the skilled artisan from the following description of illustrative embodiments when read in conjunction with the accompanying drawings.

FIG. 2 shows the X-ray luminescence spectra of $CaHfO_3$ and $Na_2HfO_3$. Excitation was accomplished utilizing a Bruker Nonius FR591 copper-anode X-ray generator. Emission spectra were collected with a SpectraPro-2150i spectrophotometer coupled to a PIXIS: 100B CCD. $CaHfO_3$, with a maxima of 430 nm, had an emission spectra consistent with a Ce-activated scintillator. The $Na_2HfO_3$ maxima at 300 nm indicates the involvement of an intrinsic reaction.

FIG. 4 shows the X-ray luminescence spectra for both Na and Ca hafnates at 1% (panels A) and 10% (panel B) Ce levels. Increasing Ce in the Ca hafnate did not shift the spectra, but did cause a reduction in light output. Addition of Ce to the Na hafnate caused a massive reduction in the 300 nm peak with a concurrent increase in a Ce-like 400 nm peak, though overall light output was greatly reduced. The signal in the 700 nm region is an artifact of the equipment.

DETAILED DESCRIPTION OF THE INVENTION

The Inorganic Scintillators

The inorganic scintillator can be in a microcrystalline or crystal form. The crystal can be any size ranging from at least 10 nm, 20 nm, 100 nm, 1 µm, 10 µm, 100 µm, or 1 mm. The crystals can also have a size ranging up to 100 nm, 1 µm, 10 µm, 100 µm, 1 mm, or 10 mm.

The cerium atoms in the inorganic scintillator substitute for the hafnium atoms. The molar percent of cerium is defined as the percent of the number of cerium atoms in the total number of cerium and hafnium atoms in the inorganic scintillator. The phrase "the molar percent of cerium is from P % to Q %" means "the molar percent of cerium" is from "P % to Q %", inclusive of both P % and Q %.

The molar percent of cerium is from 0% to 100%, or from more than 0% to 100%. The range of the molar percent of cerium in the organic scintillator can be from 0.1%, 0.5%, or 1% to 2%, 3%, 5%, 10%, 20%, 30%, 50%, 70%, or 90%. In some embodiments, the molar percent of cerium is from 0% to 50%. In some embodiments, the molar percent of cerium is from 0% to 10%. In some embodiments, the molar percent of cerium is from 0% to 5%. In some embodiments, the molar percent of cerium is from 1% to 5%. In some embodiments, the molar percent of cerium is from 1% to 10%.

The inorganic scintillators of the present invention are useful as they are scintillators and they produce a useful bright and fast scintillation in response to irradiation by visible and invisible light, such as x-ray or gamma rays. The crystals of the inorganic scintillator also have the added advantage of having the property of readily growing into crystals. Large size crystals can be grown by the following technique: Bridgman growth and related techniques, Czochralski growth and related techniques, the traveling heater method and related techniques.

In some embodiments of the present invention, the inorganic scintillator has a decay time, upon excitation by X-ray, that is equal to or less than 50 ns, 35 ns, 25 ns, or 22 ns.

The inorganic scintillator is in a microcrystalline or crystal form.

In some embodiments of the invention, the inorganic scintillator comprises a cerium-doped lithium hafnate having the formula $Li_2HfO_3$:Ce; wherein the molar percent of cerium is 0% or from more than 0% to 100%.

In some embodiments of the invention, the inorganic scintillator comprises a cerium-doped sodium hafnate having the formula $Na_2HfO_3$:Ce; wherein the molar percent of cerium is 0% or from more than 0% to 100%.

Characterization of the Inorganic Scintillators

The crystals of the invention can be characterized using a variety of methods. The crystals can be characterized regarding X-ray diffractometry, X-ray luminescence spectra, and/or pulsed X-ray time response. X-ray diffractometry determines the composition of crystalline solids, such as a crystalline phase identification. X-ray luminescence spectra determines the spectra components. Pulsed X-ray time response determines luminosity, decay times, and fractions. X-ray luminescence is used to determine the relative luminosity of a crystal. An X-ray excited emission spectra is obtained of a crystal by irradiating the crystal with an X-ray and collecting the emission light at 90° by a CCD detector.

In some embodiments of the invention, the luminosity of the inorganic scintillator is more than relative to the luminosity of YAP and/or BGO. In further embodiments of the invention, the luminosity of the inorganic scintillators is at least or more than one and a half, double, or triple relative to the luminosity of YAP and/or BGO.

Preparation of the Inorganic Scintillators

The inorganic scintillators of the invention can be prepared using a variety of methods. For example, the crystals useful for fabrication of luminescent screens can be prepared by a solid-state reaction aided, or optionally not aided, by a flux of carbonates, oxides and/or hydroxides as described herein. In some embodiments, the crystals are prepared by providing a composition comprising essentially of a mixture of the salts useful for producing the inorganic scintillator. The mixture is heated to a temperature of up to about 900° C. using a simple programmable furnace to produce a reactive mixture. The reaction is maintained at temperature for the mixture to fully react and produce the desired compound. The resultant product of reaction is then cooled slowly at about 2 to 5° C./minute. The heating, equilibration and cooling steps may be repeated for a number of times to assure complete reactions of the starting reactants. Complete mixing of the reactants can be achieved by grinding the mixture between each reactive cycle.

A particular method of preparing the inorganic scintillator of the invention is as follows: Bridgman growth and related techniques, Czochralski growth and related techniques, the traveling heater method and related techniques. These methods can be used to produce the inorganic scintillator as single crystals on a one-by-one basis.

The Bridgman growth technique is a directional solidification process. The technique involves using an ampoule containing a melt which moves through an axial temperature gradient in a furnace. Single crystals can be grown using either seeded or unseeded ampoules. The Bridgman growth technique is described in "binary organic single crystals for nonlinear optical application", *J. Korean Physical Society,* 32 pp S433-S435, 1998, "Modified Bridgman growth of a novel NLO organic crystal (2-methyoxyphenyl)-methylenepropanedinitrile", *J. of Crystal Growth,* 166, pp 542-544, 1996; "A simple inexpensive Bridgman-Stockbarger crystal growth system for organic Crystal Growth of organic materials" (ACS conference proceedings series) American Chemical Society, pp 264-266, 1996; and "A novel Bridgman-Stockbarger melt growth system for organic nonlinear optical materials", *Meas. Sci. Technol.,* 4, pp 793-795, 1993; which are incorporated in their entireties by reference.

The Czochralski growth technique comprises a process of obtaining single-crystals in which a single crystal material is pulled out of the melt in which a single-crystal seed is immersed and then slowly withdrawn; desired conductivity type and doping level is accomplished by adding dopants to the melt. The Czochralski growth technique is described in "Czochralski crystal-growth system with Diameter Control", *NASA Tech Briefs,* 21, p 10a, 1997; "Photoinduced charge in BSO:$Cr^{3+}$ homegrown single crystal at room temperature during grating formation under $Ar^+$ laser illumination in EPR experiment", *SPIE-The International Society for Optical Engineering,* 2849, pp 67-78, 1997, "A Versatile Czochralski crystal growth system with polishing of Bismuth Silicate and Bismuth Germanate", *Optics & Photonics News,* 5(2), pp S1-S2, 1994; "Morphology and formation of the color core of $Bi_{12}SiO_{20}$ crystals grown by the Czochralski method", *J. of Crystal Growth,* 137, pp 132-135, 1994; and "Observations on the polishing of Bismuth Silicon Oxide crystals", *J. of Optics* 23(4), pp 179-185, 1994; which are incorporated in their entireties by reference.

The traveling heater method is described in Triboulet, *Prog. Cryst. Gr. Char. Mater.,* 128, 85 (1994) and Funaki et al., *Nucl. Instr. And Methods,* A 436 (1999), which are incorporated in their entireties by reference.

A particular method of preparing sodium hafnate is the ceramic method which comprises the following steps: two or more powder reactants, such as sodium carbonate ($Na_2CO_3$) and hafnium oxide ($HfO_2$), are ground together, such as with a mortar and pestle, for a sufficient period, such as about 10 minutes, to produce a reactant mixture. The reactant mixture is then heated in an alumina crucible to a temperature of about 550° C. for 4 hours, and then heated to 1,100° C. for 12 hours. Optionally, cerium oxide can be added to the powder reactants for grinding.

A particular method of preparing lithium hafnate is the ceramic method which comprises the following steps: two or more powder reactants, such as lithium oxide ($Li_2O$) or lithium hydroxide (LiOH) and hafnium oxide ($HfO_2$), are ground together, such as with a mortar and pestle, for a sufficient period, such as about 10 minutes, to produce a reactant mixture. If lithium oxide is used, the reactant mixture is then heated in an alumina crucible in air to a temperature of about 1,100° C. for about 12 hours. If lithium hydroxide is used, the reactant mixture is then heated in an alumina crucible in air to a temperature of about 975° C. for about 16 hours. Optionally, cerium oxide can be added to the powder reactants for grinding.

The above processes can also be applied using sodium carbonate ($Na_2CO_3$), lithium oxide ($Li_2O$), lithium hydroxide (LiOH), hafnium oxide ($HfO_2$), and cerium oxide, in the appropriate combination, to produce the inorganic scintillators of the present invention.

The resulting crystals are then characterized by the methods described herein. The resulting crystals also have properties similar to those described herein.

Application of the Inorganic Scintillators

The inorganic scintillators of this invention have many advantages over other known crystals. The inorganic scintillators and produce a luminescence in response irradiation that is brighter and faster than known and commercially used scintillators. The scintillating crystals have a number of applications as detectors, such as in the detection of gamma-ray, which has use in national security and medical imaging applications.

The invention is useful for the detection of ionizing radiation. Applications include medical imaging, nuclear physics, nondestructive evaluation, treaty verification and safeguards, environmental monitoring, and geological exploration. In particular, the new inorganic scintillator will allow septaless time-of-flight PET to be achieved. This will be a major improvement, providing much finer resolution, higher maximum event rates, and clearer images.

The invention also relates to the use of the scintillating material above as a component of a detector for detecting radiation in particular by gamma rays and/or X-rays. Such a detector especially comprises a photodetector optically coupled to the scintillator in order to produce an electrical signal in response to the emission of a light pulse produced by the scintillator. The photodetector of the detector may in particular be a photomultiplier, photodiode, or CCD sensor.

A particular use of this type of detector relates to the measurement of gamma or x-ray radiation, such a system is also capable of detecting alpha and beta radiation and electrons. The invention also relates to the use of the above detector in nuclear medicine apparatuses, especially gamma cameras of the Anger type and positron emission tomography scanners (see for example C. W. E. Van Eijk, "Inorganic Scintillator for Medical Imaging", International Seminar New types of Detectors, 15 19 May 1995-Archamp, France. Published in "Physica Medica", Vol. XII, supplement 1, June 96).

In another particular use, the invention relates to the use of the above detector in detection apparatuses for oil drilling, (see for example "Applications of scintillation counting and analysis", in "Photomultiplier tube, principle and application", chapter 7, Philips).

It is to be understood that, while the invention has been described in conjunction with the preferred specific embodiments thereof, the foregoing description is intended to illustrate and not limit the scope of the invention. Other aspects, advantages, and modifications within the scope of the invention will be apparent to those skilled in the art to which the invention pertains.

All patents, patent applications, and publications mentioned herein are hereby incorporated by reference in their entireties.

The invention having been described, the following examples are offered to illustrate the subject invention by way of illustration, not by way of limitation.

Example 1

Synthesis of Sodium Hafnate ($Na_2HfO_3$)

Sodium hafnate is synthesized by grinding and mixing sodium carbonate ($Na_2CO_3$) and hafnium oxide ($HfO_2$) using a mortar and pestle to produce a reactant mixture. The reactant mixture is then heated in an alumina crucible to a temperature of about 550° C. for 4 hours, and then heated to 1,100° C. for 12 hours in air. XRD confirms that sodium hafnate is synthesized. The stoichiometry of $Na_2HfO_3$ is confirmed by indirectly from its X-ray diffraction pattern. No recorded powder pattern exists for the sodium hafnate compound, but the product strongly match the published pattern for $Na_2ZrO_3$. Additional support for the formula assignment is obtained from elemental analysis during SEM.

Example 2

Synthesis of Lithium Hafnate ($Li_2HfO_3$)

Lithium hafnate is synthesized by grinding and mixing lithium oxide ($Li_2O$) and hafnium oxide ($HfO_2$) using a mortar and pestle to produce a reactant mixture. The reactant mixture is then heated in an alumina crucible to a temperature of about 1,100° C. for 12 hours in air. Alternately, the reactant mixture is then heated in an alumina crucible to a temperature of about 975° C. for 16 hours in air. XRD confirms that lithium hafnate is synthesized.

Example 3

Characterization of Sodium Hafnate ($Na_2HfO_3$) and Lithium Hafnate ($Li_2HfO_3$)

Table 1 lists properties tested for sodium hafnate ($Na_2HfO_3$) and lithium hafnate ($Li_2HfO_3$).

TABLE 1

X-ray excited luminosity of hafnate compounds tested

| Compound | Added Ce (III) | Luminosity (counts/sec/μA) | Tau Fit major components | |
|---|---|---|---|---|
| $Li_3HfO_3$ | 0% | 12,347 | 606 ns | 51.6% |
| | | | >2 μs | 21% |
| $Na_3HfO_3$ | 0% | 20,710 | 1310 ns | 26.7% |
| | | | >2 μs | 35% |
| $Cs_2HfO_3$ | 0% | 434 | 32.3 ns | 10.4% |
| | | | >2 μs | 80% |
| $MgHfO_3$ | 1% | 3,551 | 21.6 ns | 14.0% |
| | | | 31.8 ns | 18.5% |
| | | | 566 ns | 14.1% |
| | | | >2 μs | 40% |

TABLE 1-continued

X-ray excited luminosity of hafnate compounds tested

| Compound | Added Ce (III) | Luminosity (counts/sec/μA) | Tau Fit major components | |
|---|---|---|---|---|
| CaHfO$_3$ | 1% | 12,630 | 33.4 ns | 57.3% |
| | | | >2 μs | 36% |
| SrHfO$_3$ | 1% | 4,449 | 21.2 ns | 40.4% |
| | | | 86.0 ns | 21.2% |
| | | | >2 μs | 13% |
| BaHfO3 | 1% | 7,460 | 16.3 ns | 88.3% |
| | | | >2 μs | 5% |
| La2Hf2O7 | 1% | 665 | 35.4 ns | 12.0% |
| | | | 109 ns | 18.7% |
| | | | 500 ns | 23.1% |
| | | | >2 μs | 39% |
| Y2Hf2O7 | 1% | 851 | 47.8 ns | 27.2% |
| | | | 520 ns | 17.4% |
| | | | >2 μs | 56% |
| LaYHf2O7 | 1% | 52 | 87.8 ns | 21.4% |
| | | | 584 ns | 22.3% |
| | | | >2 μs | 25% |
| HfO$_2$ | 1% | 1228 | 24.8 ns | 22.0% |
| | | | 51.7 ns | 17.1% |
| | | | >2 μs | 44% |

The luminosity is determined by pulsed X-ray excitation. Exponential decay components are fit to measured data TauFit software. TauFit software is described in Derenzo et al., "Design of a pulsed X-ray system for fluorescent lifetime measurements with a timing accuracy of 109 ps", *IEEE Transactions on Nuclear Science*, Volume 41(3), pp 629-631 (1994) and Derenzo et al., "Design of a pulsed X-ray system for fluorescent lifetime measurements with a timing accuracy of 109 PS", Nuclear Science Symposium and Medical Imaging Conference, 1992., Vol. 1, pp 117-119 (1992); which are incorporated by reference in their entireties. Cerium levels generating the highest luminosity for each compound tested are indicated in Table 1.

For comparison purposes, Table 2 indicates the luminosity of known scintillators using the identical

TABLE 2

Crystal vs. powder luminosity of known scintillators

| Scintillator | Luminosity (photons/MeV) | Pulsed x-ray (counts/s/mA)* | Ratio |
|---|---|---|---|
| BaF$_2$ | 10,400 | 7,200 | 1.45 |
| Bi$_4$Ge$_3$O$_{12}$ | 8,200 | 7,000 | 1.15 |
| | | | 1.9 |
| | | | 4.5 |
| | | | 1.7 |
| | | | 2.2 |
| | | | 2.1 |
| | | | 3.5 |

*Typical x-ray tube current 0.6 μA

Figure 1:
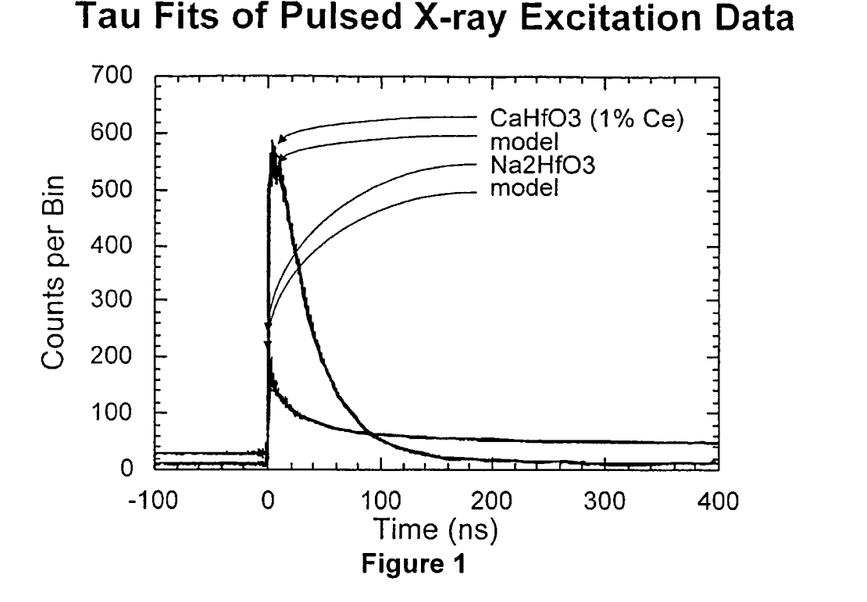
FIG. 1 shows the pulsed X-ray time response of the scintillation light and the fitted sum of exponential decay components (TauFit, designated model) for $CaHfO_3$ and $Na_2HfO_3$. This system utilizes a series of lasers to activate a light-excited X-ray tube, which then generates 80 ps X-ray pulses, A time-to-amplitude converter transforms arrival time of fluorescent protons to the time response of the scintillation emissions. The Ca hafnate exhibited a fast response (33.4 ns) indicative of a Ce-activated scintillator. The Na hafnate showed a much slower delay time (1.3 µs+>2 µs) suggesting a non-Ce luminescence mechanism.
Figure 2:
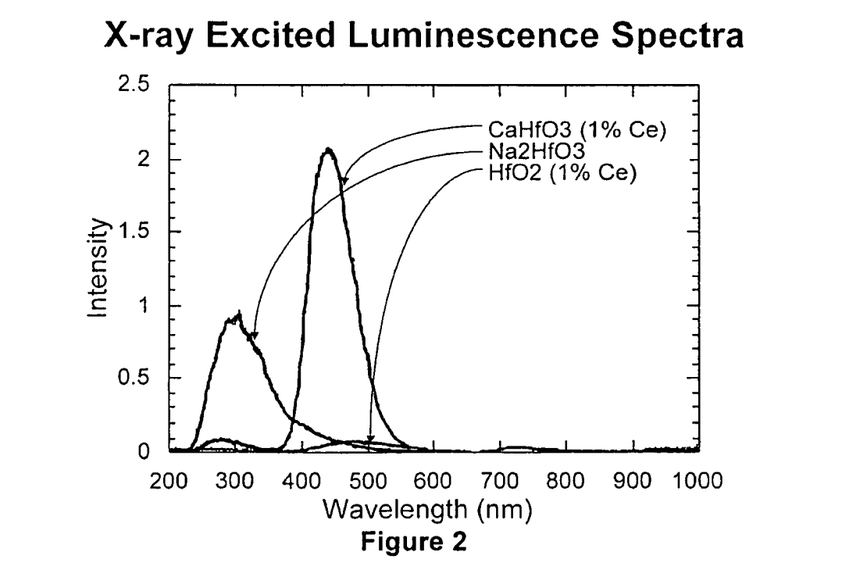

Sodium hafnate and lithium hafnate each exhibit high levels of luminosity, but with relatively slower decay times, with large contribution by decay components greater than 2 μs. (see Table 1, FIGS. 1 and 2). The maximum relative X-ray excited luminosity of was 3.26×BGO.

Sodium hafnate and lithium hafnate have luminescent patterns with significant contributions by components with decay times greater than 600 ns. X-ray luminescence spectra show a peak with a maxima at about 300 nm, below the value expected for emission involving Ce. This indicates that the scintillation involves an intrinsic mechanism independent of Ce (see FIGS. 1 and 2).

Figure 3:
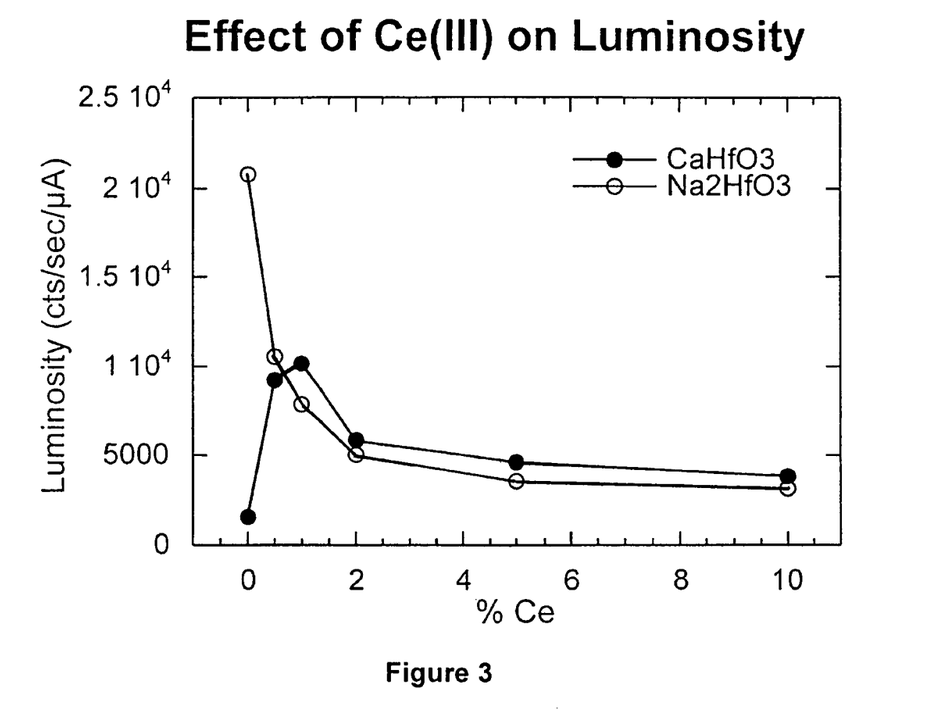
FIG. 3 shows the total luminosity as a function of Ce concentration in the Na and Ca hafnates.
Figure 4:
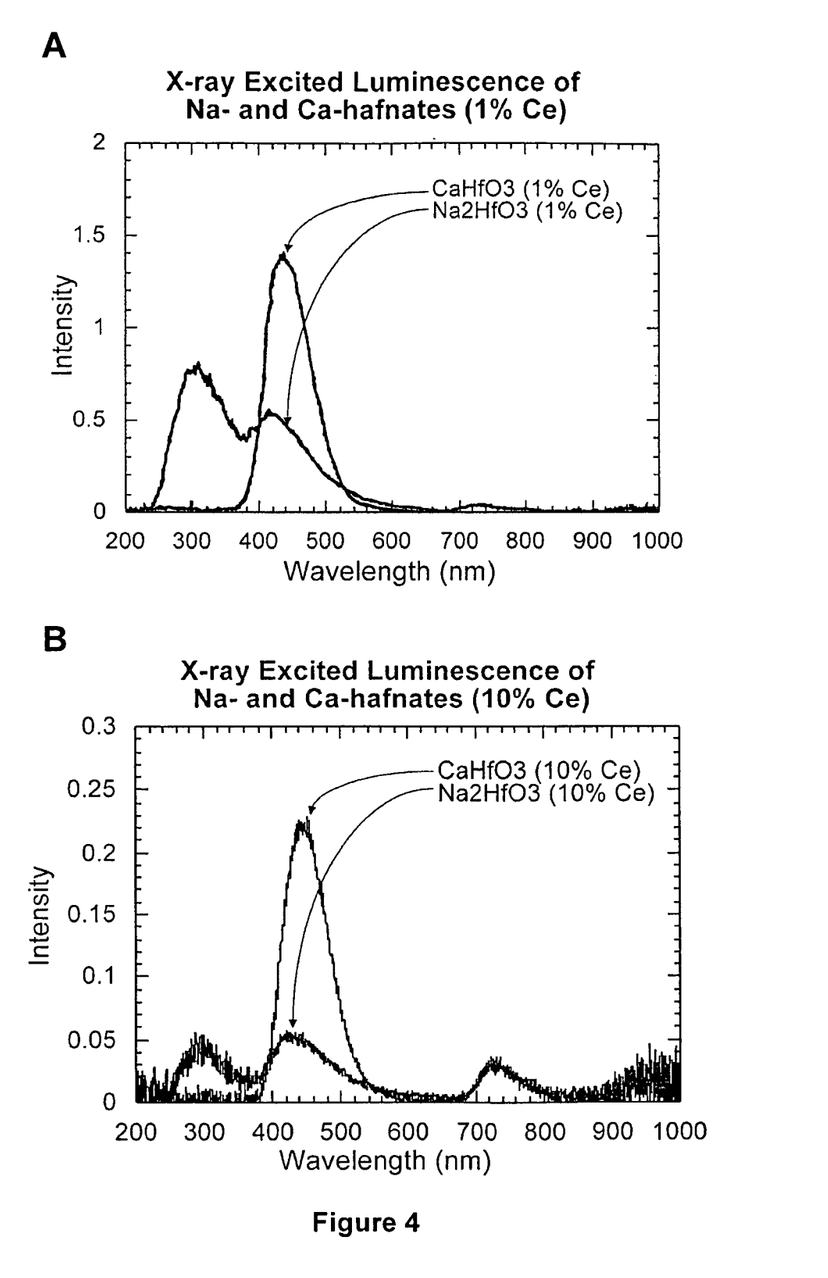

The difference in the roles of Ce in scintillation between the monovalent (i.e., sodium and lithium) and divalent hafnates is shown further in FIG. 3. There is a steep drop in the luminosity of sodium hafnate with the addition of any Ce, while the Ca-hafnate reaches a maximum at 1% added Ce. Addition of even more Ce causes a further increase in non-radiative decay in both groups. There is a qualitative shift in the non-Ce contribution of the sodium hafnate at 10% Ce, with a drop in the 300 nm signal and a small but significant growth in a Ce-like signal at 400 nm with 10% added Ce. There is no shift in the wavelength maxima (400 nm) with the calcium hafnate, just a drop in the intensity of the signal (see FIG. 4).

Example 4

Characterization of Cerium-doped Sodium Hafnate (Na$_2$HfO$_3$:Ce)

Figure 5:
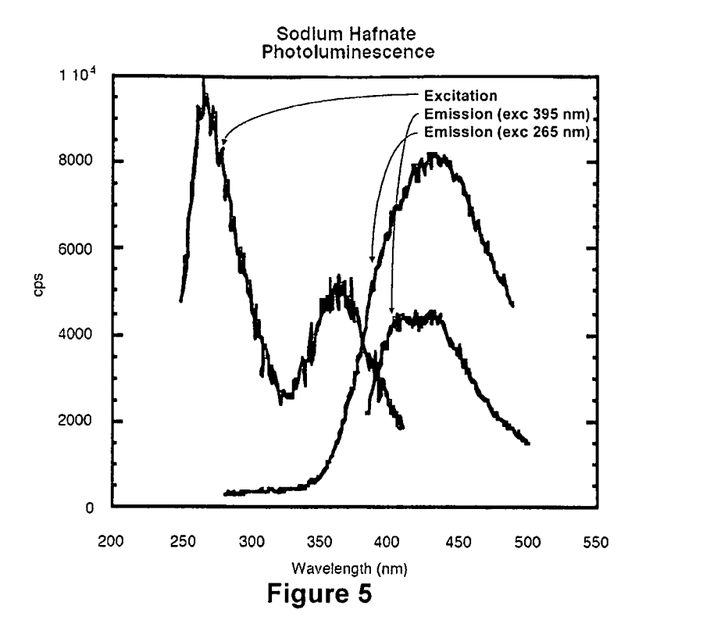
FIG. 5 shows the excitation and emission fluorescence spectra of undoped $Na_2HfO_3$.
Figure 6:
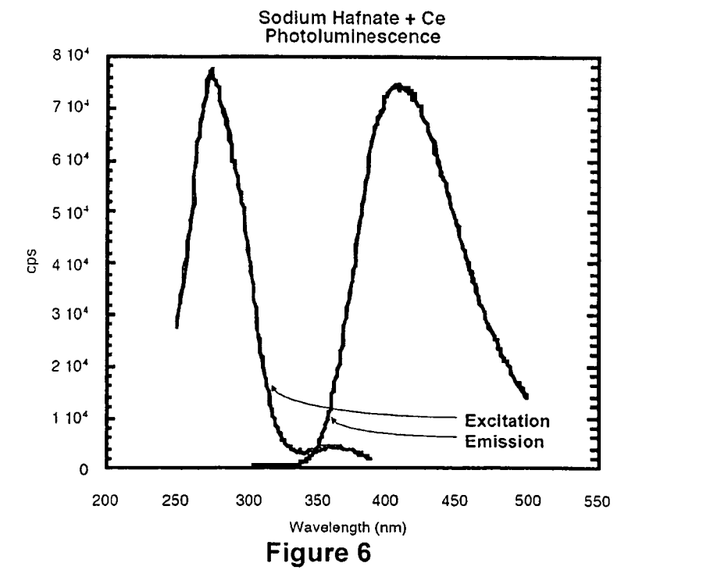
FIG. 6 shows the excitation and emission fluorescence spectra of $Na_2HfO_3$:Ce (0.5%).
Figure 7:
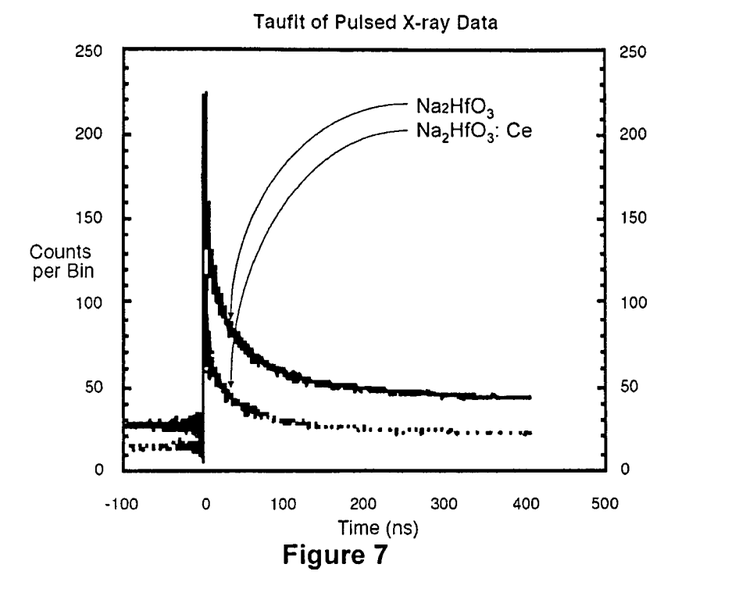
FIG. 7 shows the decay pattern of X-ray excited luminescence in $Na_2HfO_3$ powders.
Figure 8:
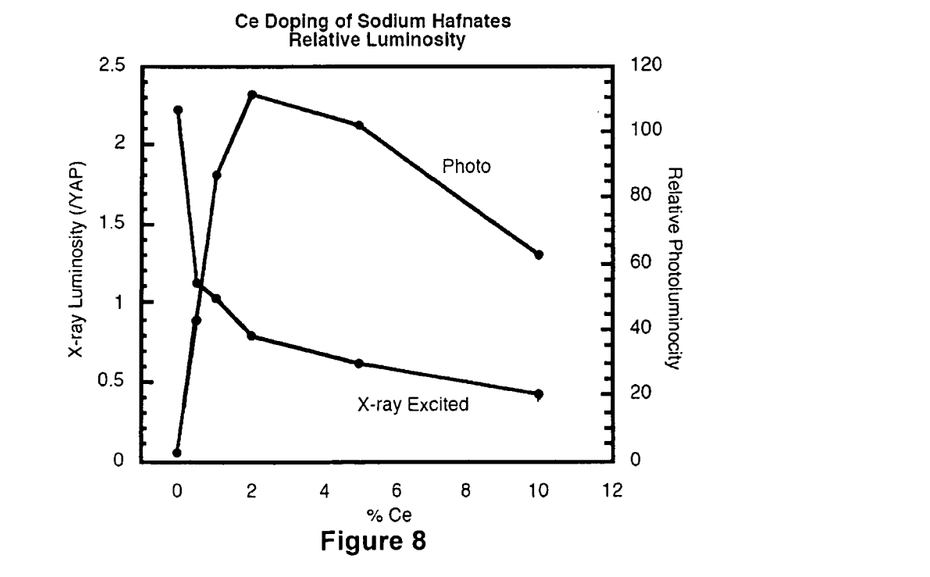
FIG. 8 shows the relative X-ray excited luminosity of $Na_2HfO_3$ with varying levels of Ce-doping. X-ray excitation levels are generated by comparison of measured luminosity to the value of BGO generated on the equipment used. Relative photoluminescence reflects a comparison of the product of peak heights and FWHM for the 410 nm emission peak.

Cerium is incorporated into sodium hafnate (Na$_2$HfO$_3$). This is demonstrated by the change in fluorescence spectrum (see FIGS. 5 and 6). Fluorescence measurements of the undoped compound show excitation peaks at 265 nm and 395 nm with an emission maximum at 410-420 nm. The addition of 0.5% cerium resulted in slight wavelength shifts in the excitation (to 27 nm) and emission (to 410 nm) peaks, and the disappearance of the 395 nm excitation peak. The addition of cerium also enhanced the photoluminescence of the compound, with a maximum increase of about 46× at a 2% cerium doping level. Cerium had an opposite effect on scintillation characteristics, with a decrease of X-ray excited luminosity with addition of even 0.5% cerium (see FIGS. 7 and 8), so sodium hafnate appears to be a self-activated scintillator. The addition of cerium does not change the decay kinetics of the X-ray excitation light emission: both the doped and undoped compounds had a dominant 1 μs time component.

While the present invention has been described with reference to the specific embodiments thereof, it should be understood by those skilled in the art that various changes may be made and equivalents may be substituted without departing from the true spirit and scope of the invention. In addition, many modifications may be made to adapt a particular situation, material, composition of matter, process, process step or steps, to the objective, spirit and scope of the present invention. All such modifications are intended to be within the scope of the claims appended hereto.

What is claimed is:

1. A composition comprising an inorganic scintillator comprising an alkali metal hafnate, cerium-doped, having the formula A$_2$HfO$_3$:Ce; wherein the A is Na, and the molar percent of cerium is 0.1% to 90%.

2. The composition of claim 1, wherein the molar percent of cerium is 0.1% to 10%.

3. A composition consisting essentially of a mixture of an alkali metal carbonate, oxide or hydroxide, cerium oxide, and hafnium oxide, wherein the alkali metal is Na, and the molar percent of cerium is from 0.1% to 90%.

4. The composition of claim 3, wherein the mixture consists essentially of solid alkali carbonate, oxide or hydroxide, and solid hafnium oxide, and solid cerium oxide, wherein the mixture has a stoichiometry of about 2 alkali metal atoms: about 1 hafnium atom.

5. The composition of claim 4, wherein (i) the solid alkali metal carbonate, oxide or hydroxide is Na$_2$CO$_3$, and (ii) the cerium oxide is Ce$_2$O$_3$.

6. The composition of claim 4, wherein the solid alkali carbonate, oxide or hydroxide, and solid hafnium oxide, and solid cerium oxide are powdered crystals.

7. The composition of claim 3, wherein the molar percent of cerium is 0.1% to 10%.

8. A method for producing the composition comprising an inorganic scintillator comprising:
   a. providing the composition of claim 3,
   b. heating the mixture so that the salts or solids start to react, and
   c. cooling the mixture of the formed composition to room temperature such that the inorganic scintillator is formed.

9. The method of claim 8, wherein the mixture consists essentially of solid alkali metal carbonate, oxide or hydroxide, and solid hafnium oxide, and solid cerium oxide, wherein the mixture has a stoichiometry of about 2 alkali metal atoms: about 1 hafnium atom.

10. A device comprising the composition of claim 1.

* * * * *